INVENTOR.
A.L. HUBBARD
BY William A. Murray
ATTORNEY

INVENTOR.
A.L. HUBBARD
BY William A. Murray
ATTORNEY

Feb. 20, 1968  A. L. HUBBARD  3,369,351
COTTON PICKER

Filed Feb. 12, 1965  9 Sheets-Sheet 4

INVENTOR.
A. L. HUBBARD

BY William A. Murray

ATTORNEY

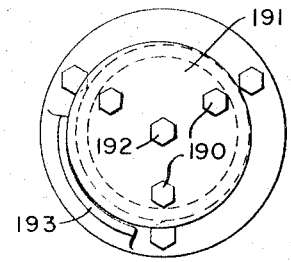
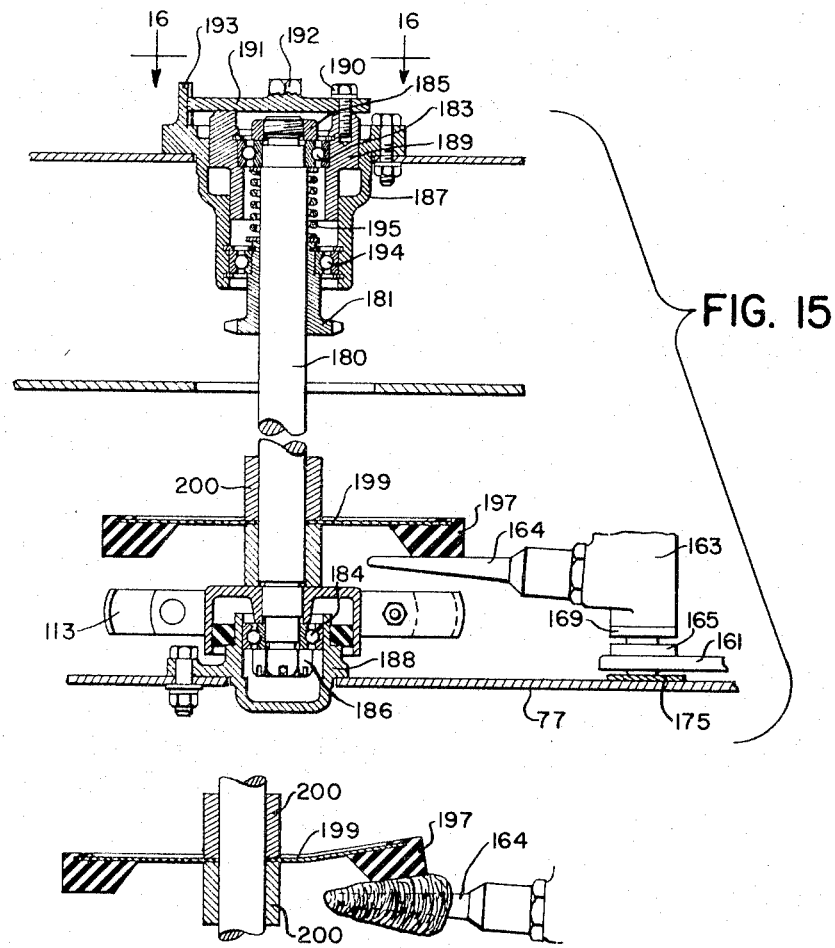
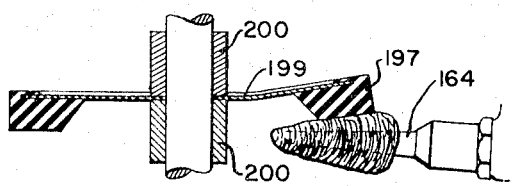

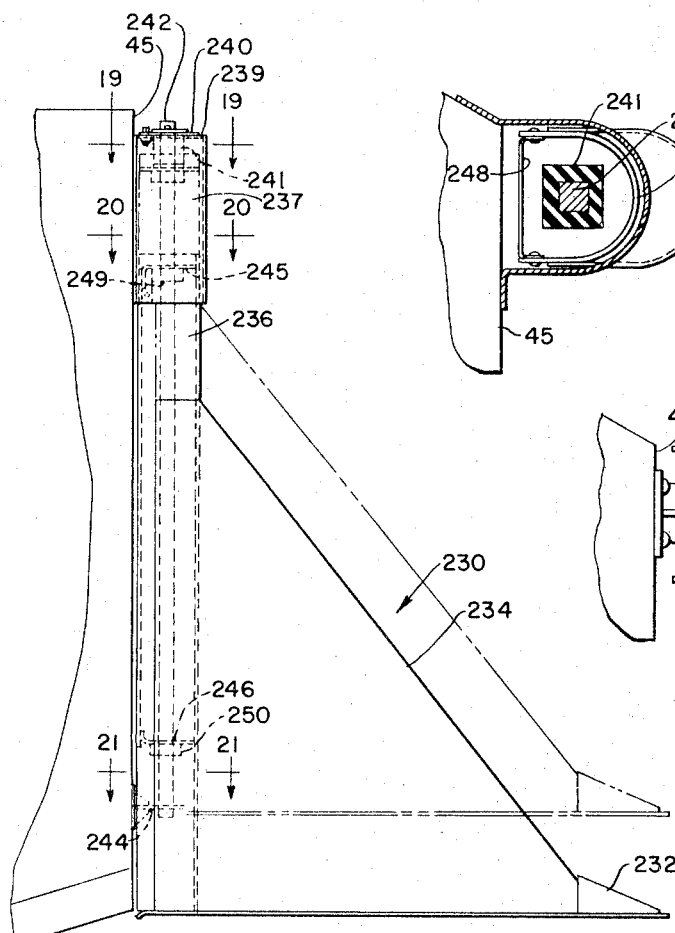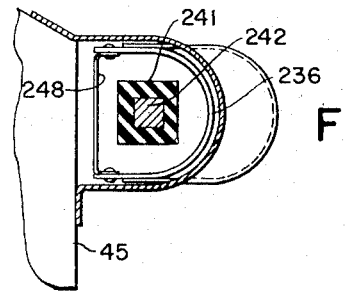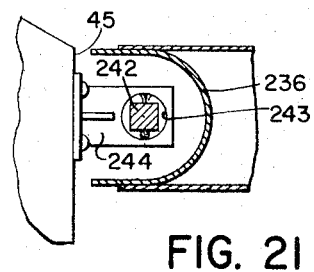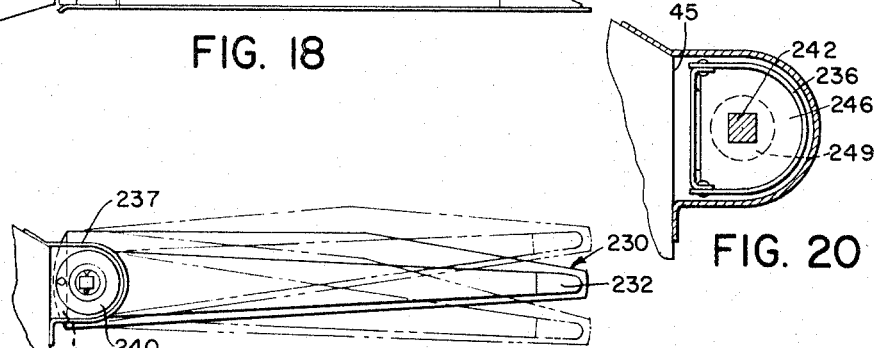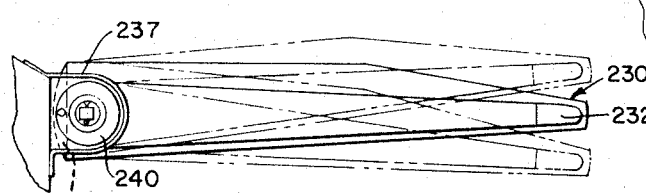

INVENTOR.
A. L. HUBBARD
BY William A. Murray
ATTORNEY

United States Patent Office 3,369,351
Patented Feb. 20, 1968

3,369,351
COTTON PICKER
Arthur L. Hubbard, Des Moines, Iowa, assignor to Deere & Company, Moline, Ill., a corporation of Delaware
Filed Feb. 12, 1965, Ser. No. 432,092
11 Claims. (Cl. 56—44)

ABSTRACT OF THE DISCLOSURE

In a cotton harvester having an upright rotatable picking drum with laterally extending picking spindles adapted to move in lateral orbits, part of which is in a plant passage and a picker housing having a side structure adjacent the drum and forming a side of the passage, the side structure being composed of a plurality of fore-and-aft extending and vertically spaced hollow bars with brush elements fixed thereto for the purpose of contacting the spindles as they move between the bars, and fluid conduits opening into the brush elements for moistening the spindles.

It is an object of the present invention to provide in the picker housing and in the side of the housing adjacent the plant passage a new and novel type of grid bar having mounted thereon moistener brushes operating to moisten the spindles prior to their advance into the plant passage for picking cotton from the plants. Specifically it is proposed to provide elongated horizontal brushes on the inner sides of the grid bars that contact the spindles as they move between the grid bars. Being on the inside of the grid bars, the bars will also offer protection for the brushes from elements and plants within the passage that might otherwise tend to damage or injure the brushes. It is also proposed to provide in the grid bars conduit means receiving moistening fluid from the top of the housing and moving it into the mositener brushes.

Other objects and advantages of the present invention will become apparent to those skilled in the art as the nature of the invention is better understood from the following description and as shown in the accompanying drawings.

FIG. 15 is an enlarged vertical sectional view of the doffing drum and a picker spindle.

FIG. 16 is a plan view of the doffing drum as taken along the line 16—16 of FIG. 15.

FIG. 17 is a sectional view of one portion of the doffing structure in its relation to a picking spindle.

FIG. 18 is an enlarged side view of one form of a forward gatherer and a forward portion of the harvesting unit.

FIG. 19 is an enlarged sectional view taken along the line 19—19 of FIG. 18.

FIG. 20 is an enlarged sectional view taken along the line 20—20 of FIG. 18.

FIG. 21 is an enlarged sectional view taken along the line 21—21 of FIG. 18.

FIG. 22 is a plan view of the structure shown in FIG. 18.

Figure 1:
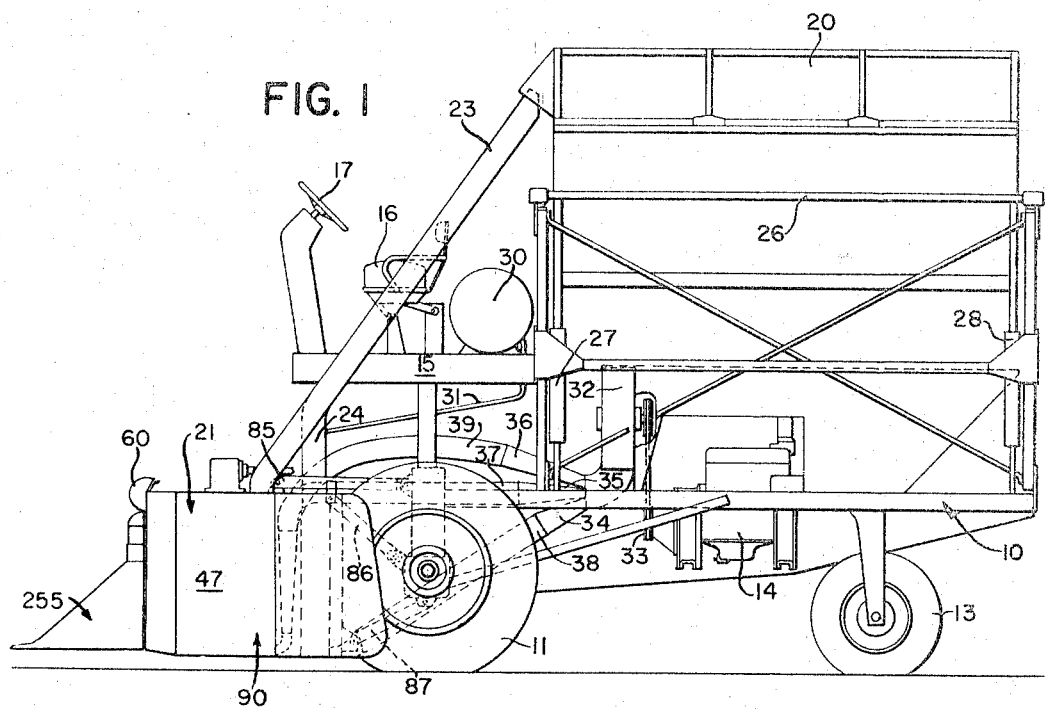
FIG. 1 is a side view of a cotton harvester incorporating the features of the present invention.
Figure 2:
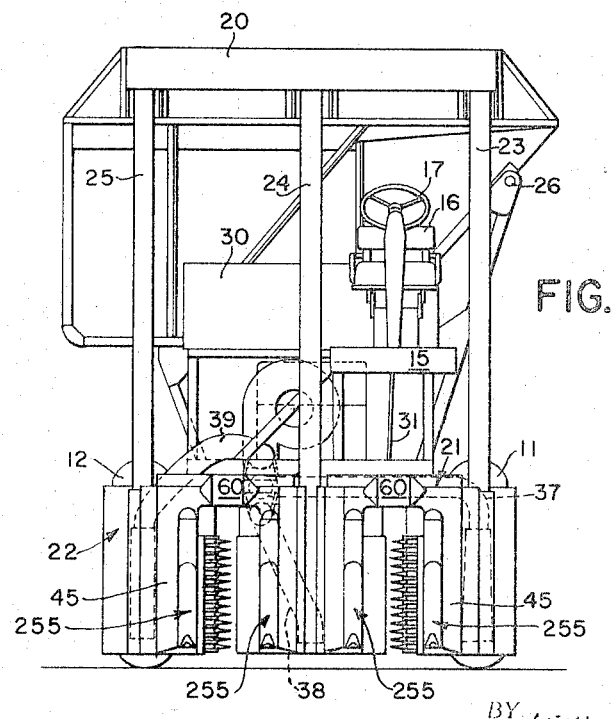
FIG. 2 is a front view of the harvester shown in FIG. 1.
Figure 3:
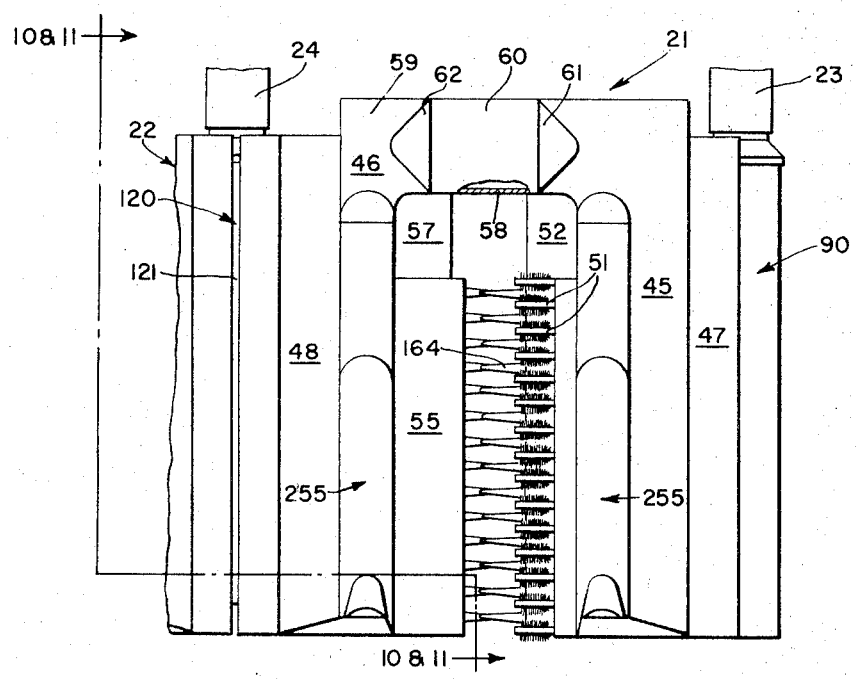
FIG. 3 is an enlarged front view of the left-hand harvesting unit.
Figure 4:
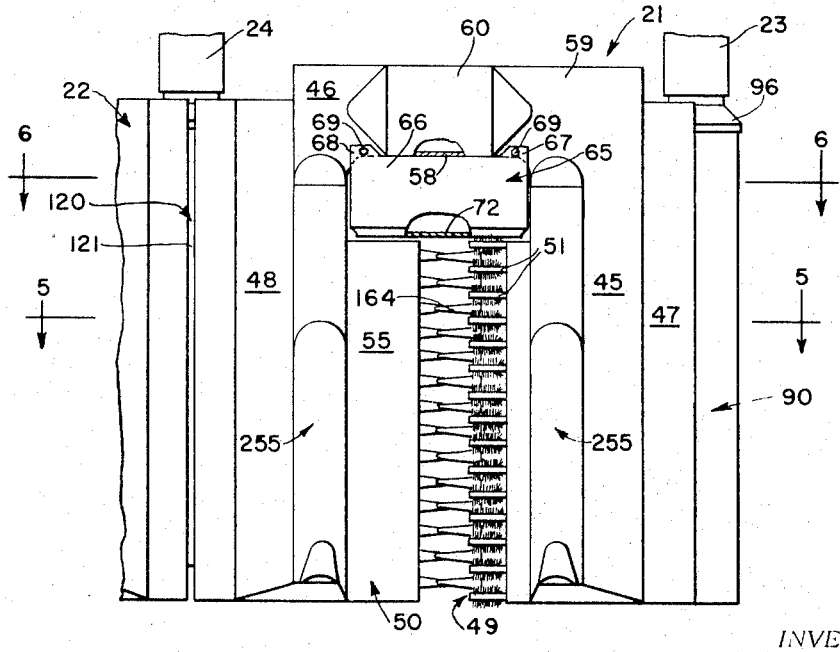
FIG. 4 is a view similar to FIG. 3 but showing additional structure mounted thereon.

Referring now to the drawings, the harvester has a main frame 10 supported at its forward end by left- and right-hand traction wheels 11, 12 and at its rear end by rear steering wheels 13. The frame 10 further includes a main power source in the form of an internal combustion engine 14 connected to the traction wheels 11, 12 in any conventional manner so as to move the harvester over a field of row-planted cotton plants. The frame 10 also supports an operator's station indicated by a platform 15, a seat 16, and a front steering mechanism 17 forward of the seat 16 where the operator may position himself to control the harvester. A material-receiving basket or container 20 is supported in an overhead relation to the frame 10 and receives harvested cotton from a pair of forwardly positioned left- and right-hand row harvesting units 21, 22 respectively, a series of three upwardly inclined ducts 23, 24 and 25 being provided for the purpose of moving the material to the upper side of the basket. The basket 20 is supported on a fore-and-aft extending pivot shaft 26 along one side of the main frame 10. The entire basket may be tilted by hydraulic means 27, 28 over the shaft 26 for purposes of discharge.

Supported on the platform 15 is a fluid container 30 having fluid conduits 31 extending downwardly and forwardly to a moistener mechanism later to be explained, contained in the picker housing.

A blower 32 is supported on the main frame forwardly of the engine 14 and is drivingly connected to the engine by a belt drive 33. The blower 32 has three discharge outlets 34, 35, 36 connected to blower ducts 37, 38, 39 in turn connected to the lower sides of the units 21, 22 at the left side, central side, and right side of the units.

Harvester housing structure

The harvesting units 21, 22 are identical in structure with the exception that they are reversed on opposite sides of the fore-and-aft center line of the harvester. Since they are identical, reference in detail will be made generally to the left harvesting unit 21. The left harvesting unit 21 has a housing structure composed of front upright wall members 45, 46, side wall structures 47, 48, and inner wall structures indicated in their entireties by the reference numerals 49, 50. The latter are spaced apart in opposed relation to one another to define a fore-and-aft extending passage through which the cotton plants may move as the harvester advances. The inner wall structure 49 on the left side of the plant passage is composed of upper and lower portions, the lower portion being formed by a series of horizontally disposed and vertically spaced grid bars 51 defining the harvesting height of the cotton harvester. The upper portion includes a fore-and-aft extending plate or panel 52 extending the entire length of the passage and is shaped to avoid the obstructions of the various mechanisms within that side of the picker housing. The rear end of the lower portion of the side wall structure 49 includes an upright pressure plate 53 that serves, in conventional manner, to press the cotton plants into the area of the picking spindles extending into the passage from the opposite housing structure on the right side of the plant passage. The inner wall structure 50 on the right side of the plant passage is composed of upper and lower portions, the lower portion being composed at its front end of an upright pressure plate structure 55 facing the grid bars 51. Vertically spaced grid bars 56 define the rear part of the lower portion of the side wall structure 50. Positioned above the pressure plate 55 and the grid bars 56 is the upper portion of the side wall structure 50 which is a smooth fore-and-aft extending upright panel 57 disposed in opposed relation to the panel 52 and extending the full length of the plant passage. An overhead laterally disposed panel 58 extends the full length of the plant passage and interconnects the upper edges of the upright upper wall portions 52, 57 and closes the upper side of the plant passage. A front transverse upright plate 59 is fixed to the upper edge portions of the front upright panels 45, 46 and bridges across the passage above the panel 58. A forwardly extending arcuate panel 60 is affixed to the plate 59 and projects forwardly therefrom above the plant passage and has a lower portion terminating adjacent the forward edge of the plate 58. The arcuate shape of the panel causes the cotton plants to move downwardly and into the plant passage. The arcuate panel 60 is substantially semi-cylindrical and has conical shaped ends 61, 62 so as to eliminate sharp edges on which plants may contact when moving into the picker.

When it is desired to harvest only the lower portion of the plant, the harvester is moved forwardly over the ground and plants are permitted to enter into the plant passage. Normally the cotton plants are higher than the height of the plate or panel 58. Therefore, the upper portion of the plant is driven or stuffed into the upper portion of the plant passage, defined by the panel 52 and the panel 57, above the grid bars and beneath the panel 58. Since there are no aggressive harvesting mechanisms in this area, the upper portion of the plant that moves through this area will not engage the harvesting mechanism.

However, in many instances it is desired to harvest the entire cotton plant. When this occurs, there is provided an attaching L-shaped panel 65 having a lower horizontally disposed leg portion 72 fitting in the passage above and closely adjacent the upper of the grid bars 56. The shorter leg portion 66 is disposed vertically and at the front of the plant passage. Lugs 67, 68 are provided on the panel 66 and are fixed to the front upright walls 45, 46 respectively of the housing structure by means of bolts 69. The rear end is bolted at 70, 71 to rear upright structure at the rear end of the housing units. The main or horizontal portion 72 is disposed adjacent the upper grid bars 52, 56 and generally closes the upper portion of the passage against the passage of cotton plants. In operation, therefore, if it is desired to harvest the entire cotton plant, the panel structure 65 is inserted into the upper portion of the plant passage and the plants are driven downwardly into the lower aggressive area of the plant passage. For more efficient harvesting, it is desirable to compress the plant into a small area so that the spindles of the harvester may penetrate and contact the ripened cotton bolls. Therefore, the panel means 65 serves two purposes, one being the eliminating of the non-aggressive upper passage portion, and the second being to condense the entire passage so that the plants are compressed into a small area for harvesting.

Figure 11:
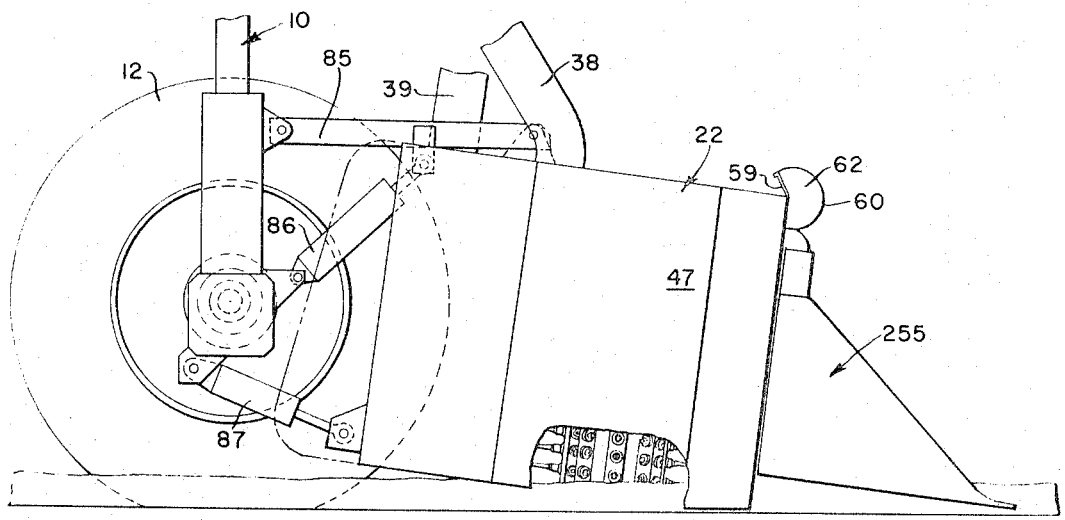
FIG. 11 is a side view similar to FIG. 10 but showing the harvesting unit in a different position.

The units 21, 22 and the housing structure thereof also include floor structure 75, 76 extending from the respective front walls or panels 45, 46 rearwardly. The floor structures 75, 76 have rear portions 77, 78 substantially horizontal and closely adjacent to the ground. The floor structures 75, 76 also have forward portions 79, 80 continuing forwardly from the respective rear portions 77, 78 in an upwardly inclined direction toward the front walls 45, 46. Cotton picking drums 81, 82, as well as their cooperating doffing drums 83, 84, are supported on the rear floor portions 77, 78. The side walls 47, 48 have lower edges generally conforming to the shape of the floors 75, 76 with a rear horizontal section and an inclined front edge section that is inclined at the angle of the front portions 79, 80. The cotton picking drums 81, 82 on opposite sides of the passage have laterally extending picking spindles. It is conventional to move the spindles in an orbit lying in a horizontal plane. By having inclined forward edges of the side panels 47, 48 and the forward inclined portions 79, 80 of the floor panels, the entire housing structure may be tilted forwardly to a location in which the inclined forward portion 79, 80 and the forward lower edges of the side panels 47, 48 lie closely adjacent to the ground. In this position, as shown in FIG. 11, the upright axis of the drum is also inclined forwardly and the normal plane of the orbit of each spindle is inclined forwardly. This causes the spindles on the forward sides of the drums 81, 82 to move close to the ground. Also, the forward spindles are closer to the ground than the spindles of the same drum when the drum is directly upright. Since cotton is normally grown in mounds with a valley between the mounds, and since the picking drums 81, 82 are normally disposed in the valleys, the forward inclined spindles, as shown in FIG. 11, tend to sweep against the sides of the mounds and salvage the fallen cotton as well as the cotton on the lower portion or underside of the plants. Thus, by providing the unique and novel method of inclining the entire housing unit so as to put the forward sides of the drums 81, 82 lower and closer to the ground, the cotton picker may be used in many instances as a salvaging type unit.

The harvesting units 21, 22 are provided with links 85 that connect the respective units to the main frame 10, Also, the harvesting units are connected to the rear axle structure by upper and lower hydraulic cylinders 86, 87 respectively that may be extended and retracted for purposes of obtaining the desired tilt of the respective units 21, 22.

The housing structure outboard of the plant passage has a rearwardly disposed material receiving compartment 90 adjacent the rear edge of the side wall 47. The compartment is composed of a front upright transverse wall 91, a rear transverse wall 92, and an innerconnecting outer fore-and-aft extending upright wall 93. Extending rearwardly from the inner edge of the front transverse wall is a rearwardly directed wall panel 94 terminating short of the rear panel 92 and defining with that panel a material discharge or receiving opening 95 disposed closely to and adjacent the doffing structure 83 for passing material from the housing into the compartment. The panels 91–94 extend substantially the entire height of the housing structure and the opening 95 extends substantially the full height of the doffer 83. The compartment is closed at its upper side by a funnel type fitting or coupling 96 having a nippled upper end adapted to receive the duct 23. The lower side of the compartment 90 is closed by the upper side 99 of a horizontally extending air duct inlet 100. An under side 101 of the duct inlet 100 is curved upwardly at its front end so as to define with the front edge of the horizontal upper side 99 an air inlet port that, upon air being introduced into the duct 100, will direct the air in an upwardly directed stream into the outlet fitting 96. It should here be noted the port is offset forwardly in respect to the opening 95 and consequently, the stream of air is also offset in a longitudinal direction from the opening. This becomes relatively important since it is desired to create a suction through the opening 95. By moving the air from the port to the duct 23, there is created a vacuum adjacent the opening 95 and, as will later become apparent, in the adjacent vicinity of the doffing mechanism 83. This causes the cotton to move into the compartment and to eventually be drawn into the stream of air moving vertically. The rear or outer end of the duct 100 has an upwardly projecting portion connected through suitable fittings 102 and the air duct 37 to the blower 32.

Extending inwardly from the front edge of the opening 95 and from the inner panel 94 is a first panel means 105, uprightly disposed and having an upright inner edge closely adjacent the outer surface of the doffing drum 83. Rearwardly of and generally in opposed relation to the panel 105 is a second upright panel 106 extending inwardly and slightly rearwardly from the inner edge of the compartment panel 92. An upright arcuately shaped panel 107 is disposed on the inner and rearward side of the doffing drum 83 and is spacedly disposed in respect to the outer surface of the drum 83. The arcuate panel 107 has a forward edge terminating closely adjacent the edge of the orbit of the picking spindles on the drum 81. It should be recognized there is sufficient space between the panel 107 and the doffing mechanism 83 to permit cotton to pass between the inner surface of the panel 107 and the doffing mechanism. Between the respective panels 106, 107 is an upright inclined panel 108 substantially parallel to the panel 106 and having an upright surface disposed to contact the cotton passing from the doffer 83 and to guide it outwardly toward the opening 95. The panel 108 and the rear portion of the panel 106 is disposed in louvered fashion so as to permit air to pass between the respective panels.

As mentioned previously, there is a suction created in the compartment 90 that draws air through the openings between the panels 106, 107, 108. The outer surface of the panel 107 is disposed to block trash moving off of the spindle drum 81 from entering into the doffing area or into the area of the compartment 90. The surface of the panel 107 guides the trash rearwardly and outwardly of the entire unit 21. The upright panels 106, 107, 108 operate with the outer periphery of the doffing drum 83 and the first panel means 105 to define an upright channel leading from the inner side of the doffing drum 83 outwardly into the compartment 90.

It is often desirous to prevent trash from entering into the comparament 90 via the openings between the panels 106, 107, 108. This is particularly true relative to the outside harvesting unit or that unit directly forwardly of the traction wheels 11, 12. For purposes of blocking trash, there is provided rearwardly of the panels 107, 106 an upright box-like structure including fore-and-aft extending transversely spaced panels 109, 110 extending rearwardly from the panels 106, 107 and interconnected at their rear ends by a transverse panel 111. The box-like structure formed by the panels 108-110 is open at its top and bottom and air moving into the opening 95 will be drawn either from the top or the bottom of these panels 108-110. Consequently, the panels 108-110 block dirt and trash moving off of the wheel 111 from entering into the compartment and also block the trash leaving the spindles from reentering into the compartment 90.

Figures 7, 8:
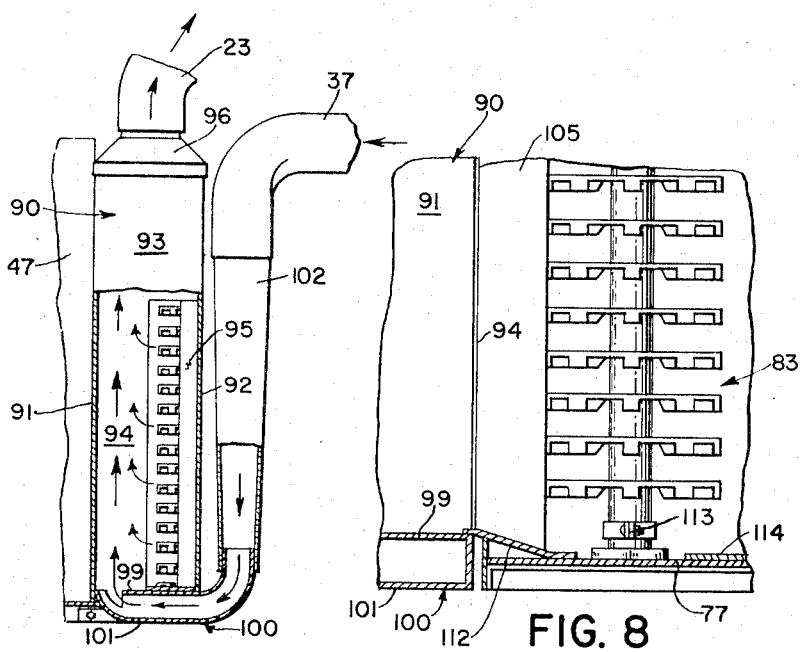
FIG. 7 is a sectional view of the discharge compartment as taken along the line 7—7 of FIG. 5.
FIG. 8 is an enlarged sectional view taken substantially along the line 8—8 of FIG. 5.
Figure 9:
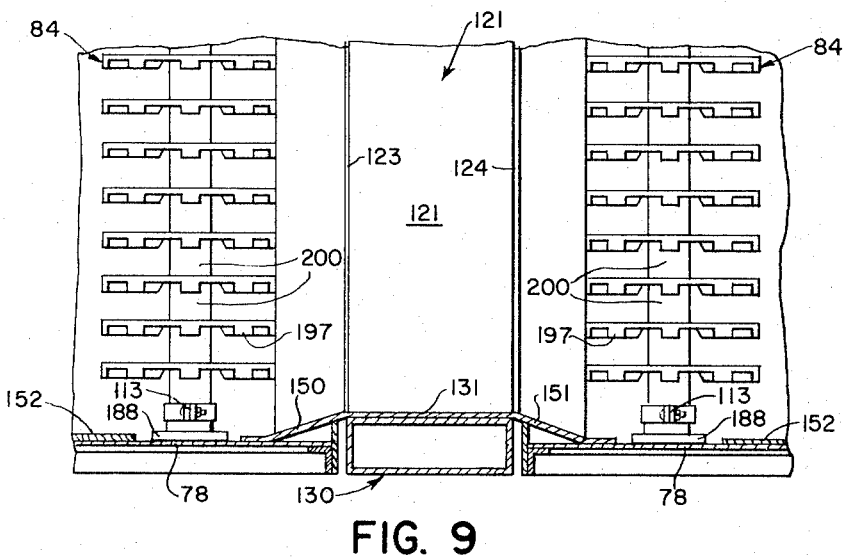
FIG. 9 is an enlarged sectional view taken substantially along the line 9—9 of FIG. 5.

Referring specifically to FIG. 8, the duct 100 is disposed to lie under the compartment 90, the upper panel 99 is at a level above the floor structure 77 of the picker housing. To overcome the variation in height and to close the channel formed between the upright panels 105, 106, there is provided a ramp panel 112 extending from the surface of the floor panel 77 upwardly and outwardly to the surface of the panel 99 defining the lower limits of the compartment 90. There is provided on the base of the doffer 83 a blade 113 that operates to sweep over the floor panel 77 and to drive the cotton on the floor 77 up the ramp panel 112. Also, the arcuate panel 107 has at its lower side a horizontal panel 114 underlying the doffing mechanism 83 and also serving to close the channel at the lower end. With the panels 114, 112 the channel guiding the material into the compartment 90 is generally closed at its lower side and consequently trash is not permitted to be sucked from the ground area into the compartment 90 nor are cotton bolls permitted to gravitate out of the channel.

A single material receiving compartment 120 serves to receive the cotton from both the inner harvesting mechanisms or doffers 84. The compartment 120 is composed of front and rear transverse panels 121, 122 respectively and left- and right-hand upright panels 123, 124 extending rearwardly from the outer edges of the front panel 121 toward the rear transverse panel 122. The rear edges of the panels 123, 124 are spaced from the panel 122 to define upright openings 125, 126 opening into the respective housings adjacent the doffers 84 of the respective units 21, 22. The openings 125, 126 are substantially equal to the height of the respective doffing drums 84. A rectangular shaped air duct 130 extends beneath a floor panel 131 defining the floor of the compartment 120. As in the case of the compartment 90, the compartment 120 has a rearwardly positioned air intake opening receiving air from the respective duct 38. The air duct 130 terminates at its forward end and drives air upwardly through an opening defined by a forward edge of the panel member 131 and the front transverse wall 120, and a portion of the respective side walls 123, 124. Consequently, air is driven upwardly through the lower port opening and is collected in the air duct 24 that extends into the basket 20. While not shown, a similar fitting to the fitting 96 on the outer units is provided for connection to the duct 24. Left- and right-hand panels 140, 141 extend inwardly from the rear upright edges of the respective fore-and-aft extending panels 123, 124 to outer edges disposed closely adjacent the doffing drums 84. Similarly panels 142, 143 extend outwardly from the rear panel 122 in an offset relation from the panels 140, 141 and in spaced relation to the doffing drums 84. Arcuate shaped panels, one being adjacent the plant passage and terminates closely shown at 144, extend around to the side of the doffer 84 adjacent the plant passage and terminates closely adjacent the point in which the spindles of the picking drums 82 contact the doffing drum 84. Disposed between the panels 142, 143 and the respective arcuate shaped upright panels 144 is a pair of baffles 145 having their edges directed toward or facing the respective openings 125, 126 and their surfaces disposed to contact cotton moving off of the doffers 84. In this respect, the panels 140-145 form an upright channel that collects and moves the cotton through the respective openings 125, 126. The panels 145 also operate as a guide to retain the cotton in the cotton-harvesting unit while permitting air to pass so as to alleviate the suction created by the stream of air moving from bottom to top in the compartment 120. Again, it should be recognized that the air inlet port of the compartment 120 is offset longitudinally forwardly of the intake openings 125, 126 and through this offset relation creates a suction in the channels as aforedescribed.

Ramps 150, 151 extend from the top of the conduit 130 to the upper surface of the floor structure 78. The respective arcuate panels 144 also have a laterally disposed panel 152 serving as a floor of the channel. The floor panel 152 and the extensions 150, 151 serve generally to close the channels at their lower sides and prevent trash from being drawn or sucked into the area of the compartment.

*Cotton-picking mechanism*

The picking mechanisms 81, 82 on opposite sides of the passage are identical to one another and are in many respects similar to that shown in A. L. Hubbard Patent 2,721,436. Consequently, details of the present picker drums will be limited to that considered new and novel in the present invention.

Figure 12:
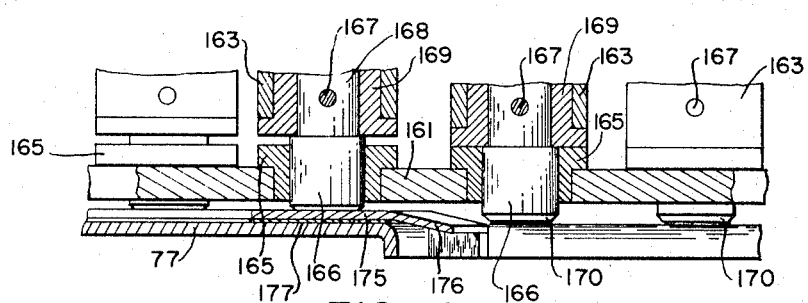
FIG. 12 is an enlarged sectional view taken substantially along the line 12—12 of FIG. 5.

The picker drum 81 is composed of upper and lower horizontally disposed main plates 160, 161 respectively, movable about upright axes defined by the drum shaft 162. Supported on the plates and disposed therebetween are a plurality of upright picker spindle bars or spindle supporting elements 163 having laterally extending and vertically spaced picking spindles 164. In conventional manner, the bars 163 are driven to oscillate about their own axes and relative to the plates 160, 161. Referring now to FIG. 12, the plate 161 is provided with picker bar bushings 165 receiving for vertical movement depending round studs 166 attached to the picker bars 163 by pins 167 extending through the member 163. A suitable oil seal bushing 169 is provided between the lower end of the picker bar 163 and an upper portion 168 of the stud 166. The entire picker bar 163 is slightly smaller in height than the spacing between the plates 160, 161 and consequently there is relative free vertical movement, within limits, of the picker bars relative to their supporting plates 160, 161.

The studs 166 extend through the plate 161 and have lower rounded or beveled portions at 170. The studs 166 may be treated as abutment members, in the manner presently to be described, for driving the picker bar upwardly.

Supported on the floor section 77 is an abutment-engaging member 175 disposed to engage the lower abutment portion of the studs 166 as the spindles on the bar approach engagement with the doffing mechanism. The abutment member 175 has a ramp portion 176 extending downwardly and outwardly and serving to guide the abutment member or stud 166 upwardly onto the horizontal surface of the member 175.

Since it is desirable to locate the spindles 164 in a position of close proximity to the doffing plates of the doffing drum 83, provision may be made for minute adjustment of the member 175 by placing shims 177 under the member 175 to raise the picker bars 163 into the exact location desired for proper doffing of the cotton from the spindles. The shims 177 may be added or taken away in the manner desired to obtain this proper location.

Figure 5:
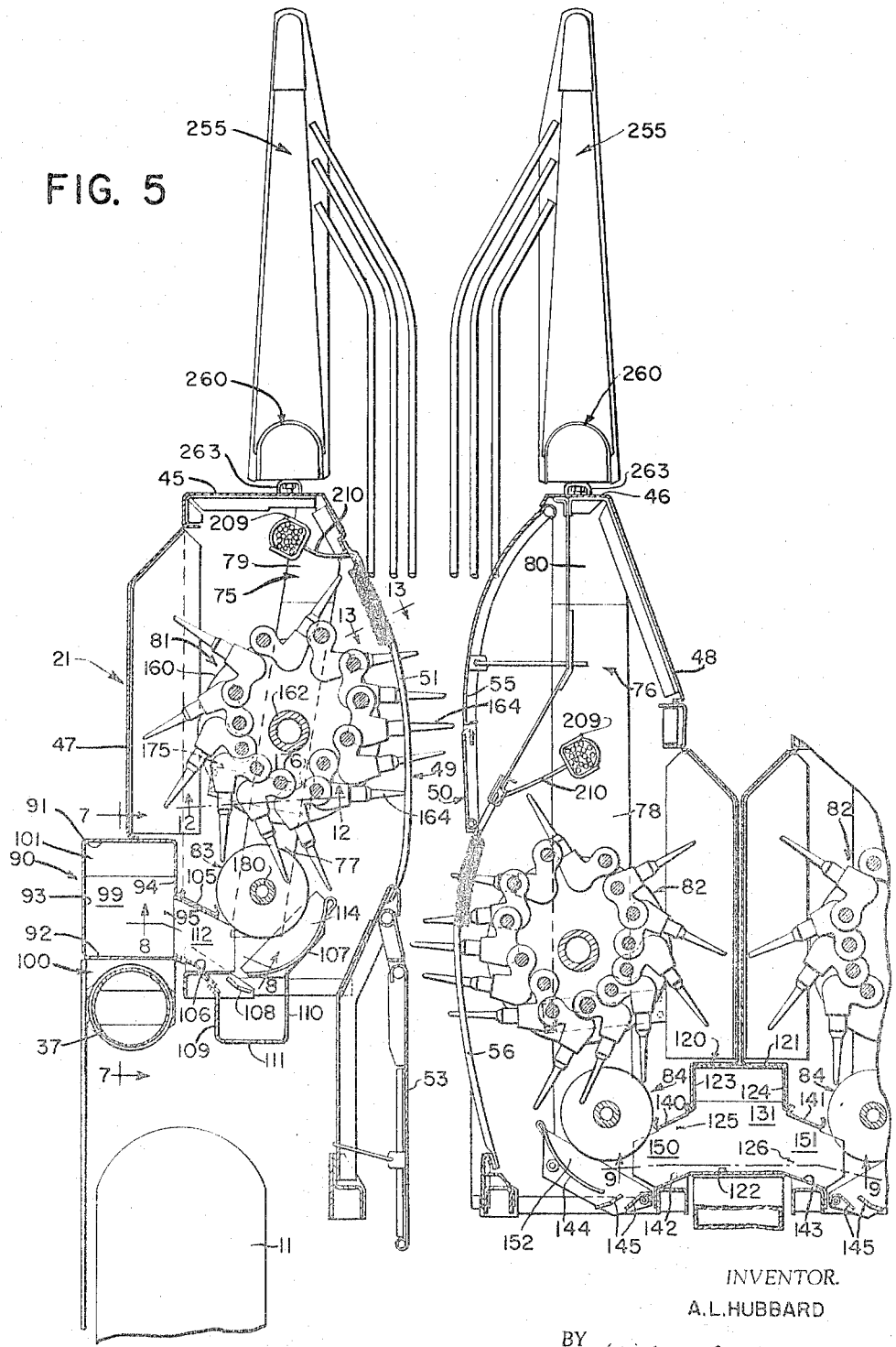
FIG. 5 is an enlarged sectional view of one of the harvesting units utilized in picking one row of cotton and a portion of the adjacent unit and is taken substantially along the line 5—5 of FIG. 4.
Figure 6:
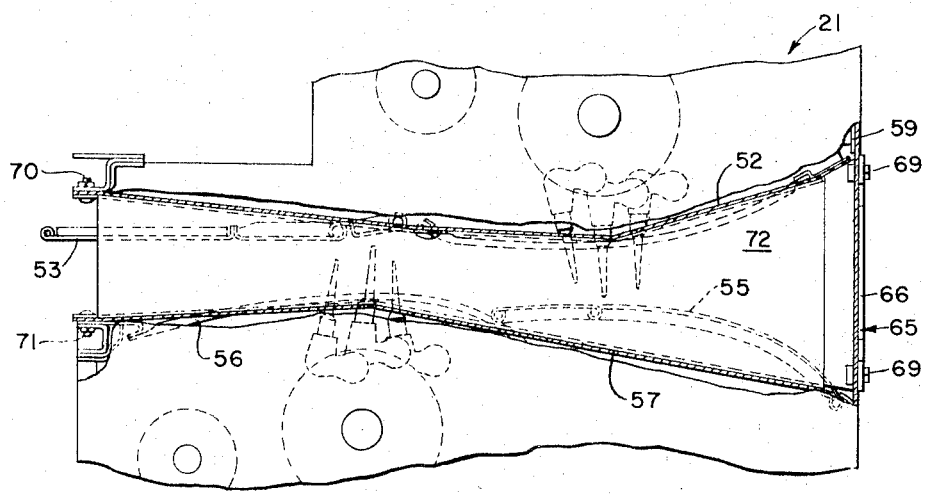
FIG. 6 is a sectional view taken substantially along the line 6—6 of FIG. 4.

It is advantageous to accurately position the picker bar by moving it up the ramp 176 onto the member 175 and to so position the member 175 that as each bar passes over the member 175, it will be in proper position relative to the overlying doffer plate. As may be seen from viewing FIG. 5, the ramp is placed in a position adapted to engage the abutment portion 166 of the picker bar 163 as it advances toward the doffing drum and to raise the bar to the correct vertical position as it passes adjacent the doffing drum. Also by having some free vertical movement of the spindles as they move through the passage, there is further advantage in that should the spindles contact a relatively hard object, the spindles may adjust vertically in order to pass the object. This, of course, will prevent damage to the spindles.

Doffing mechanism

Reviewing FIGS. 15, 16 and 17 for details of the doffing structure, the doffing structures 83, 84 are identical and include an upright shaft 180 having a chain sprocket 181 fixed thereto and connected to a chain drive, not shown, that operates to rotate the entire drum. The shaft 180 has upper and lower ends with upper and lower journals or bearings 183, 184 secured thereto by upper and lower nuts 185, 186 that bear against the ends of the bearings, the respective ends of the shafts having shoulders thereon for receiving the opposite sides of the bearings. Upper and lower shaft supports 187, 188 receive opposite ends of the shaft 180 and the respective bearings 183, 184. The lower bearing 184 is supported in the support 188 for vertical sliding movement. The upper bearing 183 is supported in a bearing support 189 in turn supported in the shaft support 187 so that the shaft 180 and its bearing 183 may move freely vertically, unless restricted. The bearing support 189 has an annular upper edge having bolted at 190 thereto a plate 191 with an eccentric outer annular edge. A hexagonal stud 192, shown in FIG. 16, projects upwardly from the upper surface of the plate 191 and is adapted to receive a conventional wrench. The shaft support 187 has an upwardly projecting angular flange 193 positioned to engage the outer annular edge of the plate 191 and to thereby lock the shaft support 189 against angular as well as vertical movement. The sprocket 181 is affixed to rotate with the shaft 180 and is journaled in a lower portion of the shaft support 187 by a bearing 194. Extending between the bearings 183, 194 and about the shaft 180 is an upright suspension spring 195 operating to bias the entire shaft 180 and the various radial elements mounted thereon upwardly. The strength of the spring 195 is sufficient to substantially counterbalance or counteract the gravitational effect on the shaft, its bearings, and other structure attached thereto.

In operation, the doffing structure and the locking mechanism 191, 193 may be utilized in the following manner. It has been determined the ideal positioning between the doffing lugs 197 and the respective spindles 164 on the spindle drum is one of bare contact between the lugs 197 and the upper surface of the spindles 164. Such a position would create no upward pressure on the lugs 197 as the spindles move underneath the lugs. The following method is therefore used to so position the lugs 197. The hexagonal lug and the plate 191 is turned by a suitable wrench so that the outer edge of the plate 191 is not in contact with the arcuate flange 193. When not in contact, the shaft 180 and the structure attached thereto is relatively free to float since the spring 195 substantially counterbalances the weight of the shaft 180 and the structure attached thereto. The entire harvester is operated so that the spindles 164 on the spindle bars 163 move in their conventional lateral orbit beneath the lugs 197. The harvester is operated in a dry run, i.e., one in which cotton plants are not passing through the harvester, and consequently the spindles 164 will contact the undersides of the lugs 197. This creates a minute upward force which will tend to raise the lugs 197 until they barely contact the upper sides of the spindles 164. Since the spring 195 substantially counterbalances the weight of the structure, the necessary force to drive the structure upwardly is relatively small and the rotation of the entire spindle drum 81 or 82 will offer sufficient upward force. While the spindle drums 81 and 82 and their respective doffing drum 83 and 84 are still rotating, the plates 191 are angularly adjusted until the outer annular edges of the plates 191 frictionally engage the surfaces of the arcuate portions 193. This locks the respective shafts in their correct vertical position. Thus, the machine is then in position to move into the field.

The doffers 83, 84, besides the shaft structure and its support, are composed of a series of vertically spaced doffer plates 199 of relatively thin sheet-like material having lugs 197 angularly spaced around its outer periphery and bonded to the under surface and outer edge thereof. Short round pipe sections 200 supported on the shafts 180 have their upper and lower edges bearing against the upper and lower surfaces of the plates 199 and operate as clamps, by tightening the nuts 186, to restrain the plates 199 against relative movement in respect to the doffer shaft. The plates 199 are flexible for the purpose of permitting them to bend upwardly should a large accumulation of cotton be carried on the surface of a spindle, either momentarily or through a clogging operation that sometimes occurs on the spindles. By permitting the plates 199 to bend or to yield upwardly, the lugs 197 are not damaged in such a situation. In view of the previously described methods of positioning the entire stack of doffer plates 199 correctly relative to the spindles 164 as well as shimming the plate 176 so that the spindles 164 are properly located, the only problem that could arise relative to improper placing of the spindles in relation to the plates 199 and their lugs 197 would occur to an uneven wear of the lugs 197. By permitting the plates 199 to yield, this uneven wearing will be minimized.

Grid bars and moistening mechanism

Figure 13:
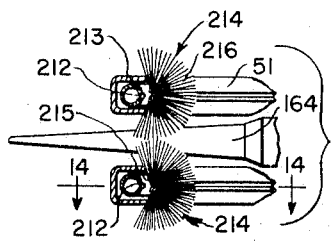
FIG. 13 is an enlarged sectional view taken substantially along the line 13—13 of FIG. 5.
Figure 14:
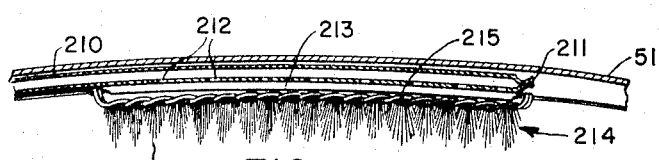
FIG. 14 is a sectional view taken substantially along the line 14—14 of FIG. 13.
Figure 10:
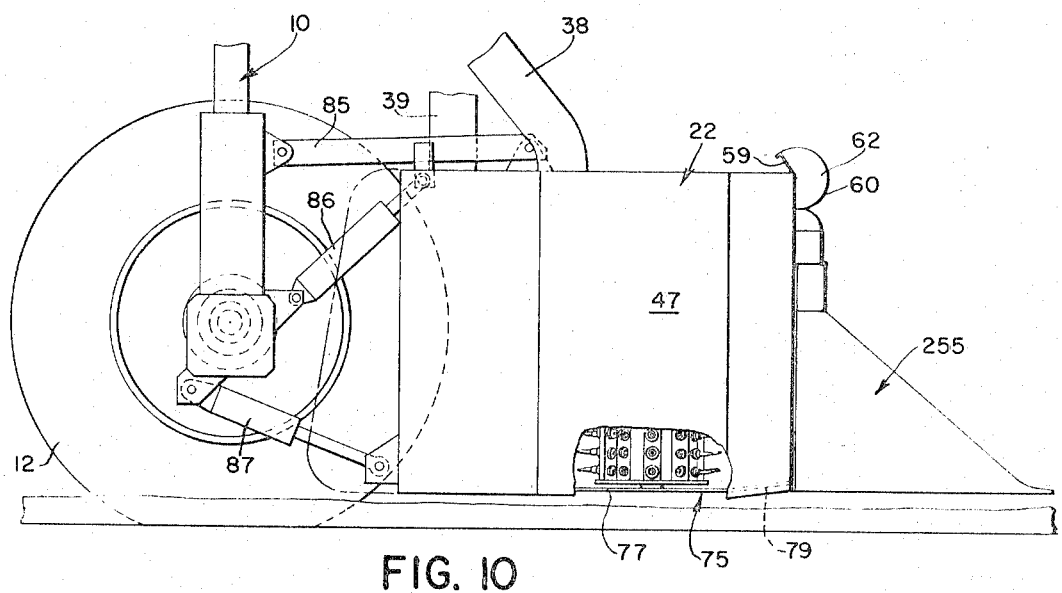
FIG. 10 is an enlarged side view of a harvesting unit and a portion of the main frame of the picker. Portions of the harvesting unit are removed for purposes of showing inside mechanism.

Fluid for maintaining the spindles 164 moist and clean is carried in the fluid drum 30 and is fed into the top of the unit housing by the hose 31 leading from the drum. The hose 31 delivers fluid into a distributing mechanism, not shown but of the type shown and described in U.S. Patent 3,137,113, and from the fluid distributing mechanism to individual hoses or conduits 210 contained behind an upright U-shaped protective shield 209. Each individual conduit 210 projects outwardly into the hollow tubular portion of the respective grid bars 51, 56 and from thence rearwardly to a closed end 211. Within the grid bars 51, 56 and adjacent the ends 211, are provided a series of longitudinally spaced fluid outlets 212 opening inwardly of the respective housing structures. The grid bars 51 are triangular in cross section except for the area of penetration of the conduit ends 210. Adjacent the conduits 210 the grid bars are flared open into a substantially U-shaped cross section and open inwardly so that fluid may pass out of the openings 212. The open side of the grid bars are shown by reference numeral 213 in FIGS. 13, 14. Extending the full length of the U-shaped portion 213 of the grid bars 51, 56 are brushes 214 having elongated central wire supports 215. The wire supports have opposite ends welded to the internal sides of the grid bars 51, 56. The wire supports 215 carry bristle-type brush elements 216 extending vertically and inwardly from the respective grid bars 51, 56. As may be seen from viewing FIG. 13, the brush elements 216 extend vertically sufficient so that they are in contact with one another at their adjacent portions.

In operation, fluid will normally pass through the outlets 212 in the conduits 210 into the brush elements 216. The brushes 214, being on the inner sides of the grid bars 51, 56 are shielded from contact with the plants and other foreign elements moving through the plant passage. However, as the spindles at 164 approach the position of moving into the plant passage in their orbital movements, they will contact and be brushed by the bristles 216 of the brush elements 214. This will serve the purpose of brushing the juices of the plants and other foreign material from the spindles at the point of their entrance into the plant passages. The brushes 216 being above and below the spindles 164 normally brush the spindles from both the top and the bottom sides thereof. Consequently, there is obtained a double cleaning action. The hoses 210, being internal of the grid bars 51, 56, are also protected from the material moving through the plant passage. The brushes 214, being dampened by the fluid, will dampen or wet the surfaces of the spindles 164.

Plant lifters and gatherers

Referring now to the gatherer structure shown in FIGS. 18–23, projecting forwardly from the front walls 45, 46 are plant gathers 230. The gatherers 230 are triangularly shaped and extend rearwardly from lower front toes 232. The shields 230 have arcuate shaped crowns 234 with depending side sheets. The gatherers 230 are identical and consequently details of the mounting arrangement will be shown relative to the gatherer 230 and its relation to the front wall structure 45. The shield 230 has an upright U-shaped column 236 at its rear and adjacent the wall 45 with an upper projecting end telescoping into an upright U-shaped member or column 237 affixed to the front wall 45. Consequently, unless restricted, the entire shield 230 may move vertically within the member 237. The column 237 is closed by an upper laterally extending plate 239. The plate 239 carries a rubber cushion composed of a plate 240 having bonded to its underside a square-shaped rubber support 241. Carried within the rubber support 241 is a square-shaped upright rod 242 extending substantially the full length of the gathering structure. The lower end of the rod 242 extends through a round opening 243 provided in a forwardly projecting bracket 244 welded to the front face of the front wall structure 45. Suitable pins extend through the upper and lower ends of the rod 242 for limiting axial displacement of the rod 242. The U-shaped channel 236 extends the full length of the gatherer 230 and has upper and lower transverse horizontal panels 245, 246 having square openings for receiving the rod 242. Opposite transversely spaced leg portions of the channel 236 are cross-braced by an upright transverse panel 248. The panels 245, 246 are reinforced around the rod 242 by depending bosses 249, 250 respectively, welded to the underside of the panels 245, 246 and having square-shaped openings for receiving the square rod 244. As may be clearly apparent, the entire gatherer 230 may move vertically on the rod 242. Also, viewing FIGS. 19 and 20, it becomes apparent the channel 236 is considerably smaller than the U-shaped channel 237 and consequently there is freedom for lateral movement. However, lateral movement will be resisted by the rubber gasket 241 and the gasket 241 will also tend to bias the gatherer 230 into its fore-and-aft or normal disposition.

Figure 23:
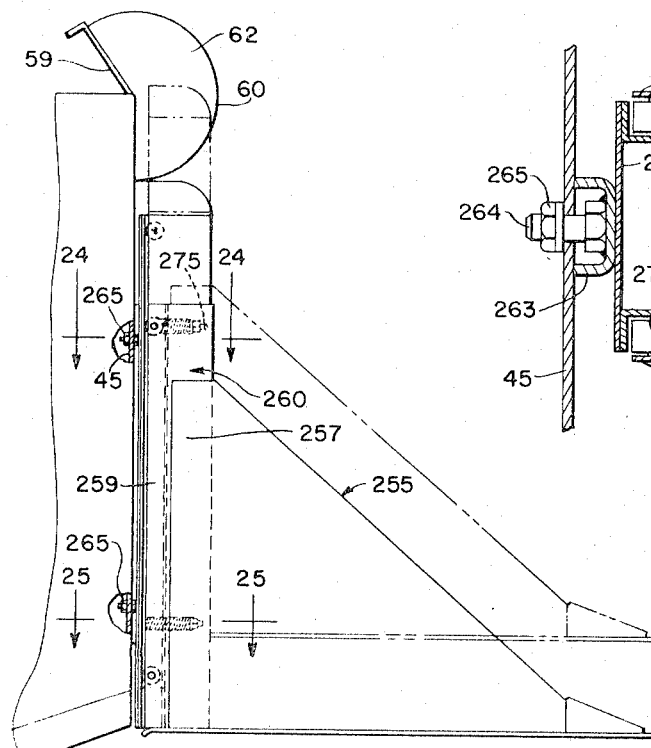
FIG. 23 is a side view of the preferred form of the gatherer.
Figure 24:
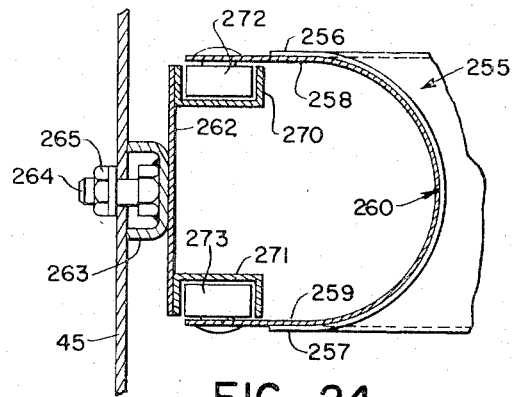
FIG. 24 is an enlarged sectional view taken substantially along the line 24—24 of FIG. 23.
Figure 25:
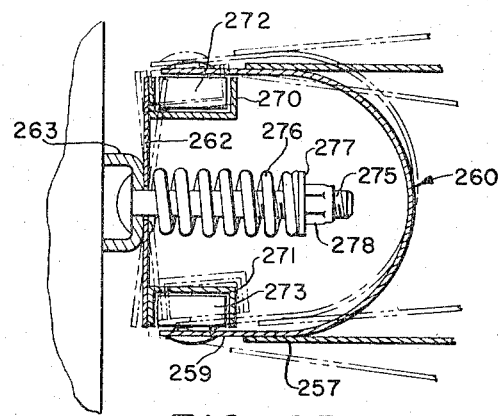
FIG. 25 is an enlarged sectional view taken substantially along the line 25—25 of FIG. 23.

In the preferred form of gathering structure shown in FIGS. 23–25, a forward gathering panel 255 has vertical side portions 256, 257 welded to opposite upright sides 258, 259 respectively of an upright U-shaped channel member 260. Affixed to the front wall structure 45 is an upright plate 262 bearing against a rearwardly projecting channel 263 with studs 264 extending through the wall 45 carrying nuts 265 in its vertical position. The plate carries on its front side a pair of outwardly opening U-shaped tracks 270, 271 extending substantially the full height of the gatherer. The sides 258, 259 of the U-shaped channel 260 carries inwardly projecting rollers 272, 273 spaced vertically apart and resting in the tracks 270, 271 to permit the entire gatherer 255 to move vertically.

The plate 262 is fixed to the upright support 263 by a pair of vertically spaced bolts 275 extending through the support 263, the plate 262, and springs 276 bearing against the plate 262. Washers 277 bear against the opposite end of the springs 276 and nuts 278 are mounted on the bolts 275 to retain the washers and springs. As in the previous form of the invention, the entire U-shaped channel 260 may move vertically on the tracks 270. Lateral movement of the gatherer 255 is permitted through displacement of the springs 276. The springs 276 also serve the purpose of repositioning the entire gatherer 255 in its fore-and-aft or normal disposition.

While only the preferred forms of the invention have been shown, it should be recognized that other forms and variations will occur to those skilled in the art. Therefore, while the preferred forms have been shown for the purpose of concisely and completely illustrating the principles of the invention, it should be understood that there is no intention to limit or narrow the invention beyond the broad concepts set forth in the appended claims.

What is claimed is:

1. A cotton harvester movable forwardly over a field of cotton plants comprising: an upright rotatable picking drum having laterally extending picking spindles vertically spaced and adapted to move in lateral orbits about the axis of rotation of the drum, part of each of the orbits being in a direction of front to rear; a picker housing encasing and supporting the drum having a fore-and-aft extending side structure closely adjacent the drum and open to permit the respective spindles to extend outwardly thereof during the aforesaid part of the orbit to harvest cotton from plants adjacent the side structure, the side structure including a plurality of fore-and-aft extending horizontal hollow bars having inner surfaces facing the drum and relatively smooth surfaces facing outwardly toward the plants, the bars being vertically spaced and disposed between the spindles; brush members supported on the bars on their respective inner surfaces and having vertically projecting brush elements contacting the respective spindles as each moves in the front part of the aforesaid part of their orbit and just prior to moving outwardly of the bars; a plurality of fluid conduits supported internally of the housing and opening to the hollow portion of the bars and having communication means with the brushes.

2. A cotton harvester movable forwardly over a field of cotton plants comprising: an upright rotatable picking drum having laterally extending picking spindles vertically spaced and adapted to move in lateral orbits about the axis of rotation of the drum, part of each of the orbits being in a direction of front to rear; a picker housing encasing and supporting the drum having a fore-and-aft extending side structure closely adjacent the drum and open to permit the respective spindles to extend outwardly thereof during the aforesaid part of the orbit to harvest cotton from plants adjacent the side structure, the side structure including a plurality of fore-and-aft extending horizontal bars having inner surfaces facing the drum and relatively smooth surfaces facing outwardly toward the plants, the bars being vertically spaced and disposed between the spindles; brush members supported on the bars forward of the drum and disposed alongside their respective inner surfaces and having vertically projecting brush elements contacting the respective spindles as each moves in the front part of the aforesaid part of their orbit and just prior to moving outwardly of the bars; a plurality of fluid conduits supported internally of the housing having discharge ends supported by the bars and in communication with the brushes.

3. A cotton harvester movable forwardly over a field of cotton plants comprising: an upright rotatable picking drum having laterally extending picking spindles vertically spaced and adapted to move in lateral orbits about the axis of rotation of the drum, part of each of the orbits being in a direction of front to rear; a picker housing encasing and supporting the drum having a fore-and-aft extending side structure closely adjacent the drum and open to permit the respective spindles to extend outwardly thereof during the aforesaid part of the orbit to harvest cotton from plants adjacent the side structure, the side structure including a plurality of fore-and-aft extending horizontal bars having inner surfaces facing the drum and relatively smooth surfaces facing outwardly toward the plants, the bars being vertically spaced and disposed between the spindles; and brush members supported on the bars forward of the drum and disposed alongside thereof and having vertically projecting brush elements contacting the respective spindles as each moves in the front part of the aforesaid part of their orbit and just prior to moving outwardly of the bars.

4. A cotton harvester movable forwardly over a field of cotton plants comprising: an upright rotatable picking drum having laterally extending picking spindles vertically spaced and adapted to move in lateral orbits about the axis of rotation of the drum, part of each of the orbits being in a direction of front to rear; a picker housing encasing and supporting the drum having a fore-and-aft extending side structure closely adjacent the drum and open to permit the respective spindles to extend outwardly thereof during the aforesaid part of the orbit to harvest cotton from plants alongside and outwardly of the side structure, the side structure including a plurality of fore-and-aft extending horizontal bars vertically spaced and disposed between the spindles and brush members supported on the bars forward of the drum having vertically projecting brush elements extending from the bars contacting the respective spindles as each advances toward the bars.

5. A cotton harvester adapted to move forwardly over a field of cotton plants comprising: an upright rotatable picking drum having laterally extending picking spindles vertically spaced and adapted to move in lateral orbits about the axis of rotation of the drum, part of each of the orbits being in a direction of front to rear; a picker housing encasing and supporting the drum having a fore-and-aft extending side structure closely adjacent the drum and open to permit each of the spindles to extend outwardly thereof during its aforesaid part of the orbit to harvest cotton from plants alongside the side structure, the side structure including a plurality of fore-and-aft extending horizontal hollow bars vertically spaced and disposed between the spindles; brush members supported on the bars forward of the drum having vertically projecting brush elements contacting the spindles as they move in the front of the aforesaid parts of their orbits and as they move outwardly of the bars; fluid conduit means supported on the housing and opening to the hollow portions of the bars; and fluid communication means between the hollow portions and the brushes.

6. A cotton harvester adapted to move forwardly over a field of cotton plants comprising: an upright rotatable picking drum having laterally extending picking spindles vertically spaced and adapted to move in lateral orbits about the axis of rotation of the drum, part of each of the orbits being in a direction of front to rear; a picker housing encasing and supporting the drum having a fore-and-aft extending side structure closely adjacent the drum and open to permit each of the spindles to extend outwardly thereof during its aforesaid part of the orbit to harvest cotton from plants alongside the side structure, the side structure including a plurality of fore-and-aft extending horizontal hollow bars vertically spaced and disposed between the spindles; brush members supported on the bars forward of the drum having vertically projecting brush elements extending above and below the respective bars to contact the lower and upper portions respectively of the spindles as they move in the front of the aforesaid parts of their orbits; fluid conduit means supported on the housing and opening to the hollow portions of the bars; and fluid communication means between the hollow portions and the brushes.

7. A cotton harvester adapted to move forwardly over a field of cotton plants comprising: an upright rotatable picking drum having laterally extending picking spindles vertically spaced and adapted to move in lateral orbits about the axis of rotation of the drum, part of each of the orbits being in a direction of front to rear; a picker housing encasing and supporting the drum having a fore-and-aft extending side structure closely adjacent the drum and open to permit each of the spindles to extend outwardly thereof during its aforesaid part of the orbit to harvest cotton from plants alongside the side structure, the side structure including a plurality of fore-and-aft extending horizontal hollow bars vertically spaced and disposed between the spindles; and brush members supported on the bars forward of the drum having vertically projecting brush elements extending above and below the respective bars to contact the lower and upper portions respectively of the spindles as they move in the front of the aforesaid parts of their orbits.

8. A combination moistener and grid bar assembly for use in a cotton harvester having an upright structure with laterally extending and vertically spaced spindles adapted to move front to rear in a fore-and-aft extending plant passage for harvesting cotton from cotton plants, the assembly comprising: a horizontally disposed tubular bar having a hollow central portion and forward and rear ends adapted for support on the harvester for normal disposition between a pair of vertically spaced spindles and with a side thereof facing the upright structure; an elongated brush supported adjacent the forward end of the bar and having fore-and-aft portions thereof fixed to the bar so that the brush lies alongside the foresaid side of the bar, the brush further having vertically extending brush elements projecting above and below the bar for contact with lower and upper portions of the respective spindles above and below the bar; fluid communication opening means extending from the hollow central portion to the brush; and means on the bar for connecting a fluid source to and for effecting fluid communication between the source and the hollow central portion.

9. A combination moistener and grid bar assembly for use in a cotton harvester having an upright structure with laterally extending and vertically spaced spindles adapted to move front to rear in a fore-and-aft extending plant passage for harvesting cotton from cotton plants, the assembly comprising: a horizontally disposed tubular bar having a hollow central portion and adapted for support on the harvester for normal fore-and-aft disposition between a pair of vertically spaced spindles; an elongated spindle brush supported adjacent the forward end of the bar and fixed to the bar so that the brush lies alongside the bar, the brush further having vertically extending brush elements projecting above and below the bar for contact with lower and upper portions of the respective spindles above and below the bar; and fluid communication opening means extending from the hollow central portion to the brush.

10. A combination spindle brush and grid bar assembly for use in a cotton harvester having an upright structure with laterally extending and vertically spaced spindles adapted to move front to rear in a fore-and-aft extending plant passage for harvesting cotton from cotton plants, the assembly comprising: a horizontally disposed bar adapted for support on the harvester alongside and for defining a part of the plant passage and for normal fore-and-aft disposition between a pair of vertically spaced spindles; an elongated spindle brush supported adjacent the forward end of the bar and fixed to the bar along one side thereof, the brush further having brush elements projecting vertically from the bar for contacting spindles adjacent the bar.

11. A combination moistener and grid bar assembly for use in a cotton harvester having an upright structure with laterally extending and vertically spaced spindles adapted to move front to rear in a fore-and-aft extending plant passage for harvesting cotton from cotton plants, the assembly comprising: a horizontally disposed bar adapted for support on the harvester alongside and for defining a part of the plant passage and for normal disposition between a pair of vertically spaced spindles with a side thereof facing the upright structure; an elongated moistener member supported on the bar and fixed to lie along one side thereof, the moistener member having brush means projecting vertically to contact spindles; and means on the bar for connecting a fluid source to and for effecting fluid communication between the source and the moistener member.

References Cited

UNITED STATES PATENTS

| | | | |
|---|---|---|---|
| 1,737,850 | 12/1929 | Johnston et al. | 56—47 |
| 1,747,566 | 2/1930 | Berry | 56—14 |
| 2,650,462 | 9/1953 | Skaggs | 56—14 |

ANTONIO F. GUIDA, *Primary Examiner.*

ABRAHAM G. STONE, RUSSELL R. KINSEY,
*Examiners.*